United States Patent
Takagi et al.

(10) Patent No.: US 7,260,065 B2
(45) Date of Patent: Aug. 21, 2007

(54) DATA COMMUNICATION APPARATUS

(75) Inventors: Genzou Takagi, Ageo (JP); Yoshihiro Noguchi, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 1113 days.

(21) Appl. No.: 10/193,096

(22) Filed: Jul. 12, 2002

(65) Prior Publication Data

US 2002/0186709 A1    Dec. 12, 2002

Related U.S. Application Data

(63) Continuation of application No. 09/077,290, filed as application No. PCT/JP97/03905 on Oct. 28, 1997, now Pat. No. 6,426,946.

(30) Foreign Application Priority Data

Oct. 30, 1996    (JP) ................................ 8-287879

(51) Int. Cl.
*H04N 1/00*    (2006.01)
(52) U.S. Cl. ...................... 370/241; 358/435
(58) Field of Classification Search ................ 370/252, 370/241; 709/227, 228; 358/434, 435, 436
See application file for complete search history.

(56) References Cited

U.S. PATENT DOCUMENTS

| | | | |
|---|---|---|---|
| 4,931,250 A * | 6/1990 | Greszczuk | 375/222 |
| 5,173,786 A | 12/1992 | Nakagawa | |
| 5,311,578 A * | 5/1994 | Bremer et al. | 379/93.32 |
| 5,661,568 A | 8/1997 | Ueno | |
| 5,696,606 A | 12/1997 | Sakayama et al. | |
| 5,751,796 A * | 5/1998 | Scott et al. | 379/93.31 |
| 5,818,603 A | 10/1998 | Motoyama | |
| 5,907,599 A | 5/1999 | Sakayama et al. | |
| 6,122,071 A | 9/2000 | Yoshida | |
| 6,426,946 B1 | 7/2002 | Takagi et al. | |
| 6,831,897 B2 * | 12/2004 | Takagi et al. | 370/252 |

FOREIGN PATENT DOCUMENTS

| | | |
|---|---|---|
| EP | 0412723 | 2/1991 |
| EP | 0507522 | 10/1992 |

(Continued)

OTHER PUBLICATIONS

English language abstract of JP 4-301963.

(Continued)

*Primary Examiner*—Min Jung
(74) *Attorney, Agent, or Firm*—Greenblum & Bernstein, P.L.C.

(57) ABSTRACT

A data communication apparatus includes a communication section that performs pre-communication protocol to exchange a communication function with a communication destination terminal, and transmits data to the communication destination terminal after the pre-communication protocol. A detector detects whether or not the communication destination terminal can perform a short protocol in which at least a communication protocol for line probing is omitted. When the detector detects that the communication destination terminal can perform the short protocol, a controller obtains communication parameters from the communication destination terminal, stores the obtained communication parameters in a memory in association with the communication destination terminal. The stored communication parameters are utilized to perform the short protocol.

10 Claims, 13 Drawing Sheets

FOREIGN PATENT DOCUMENTS

| | | |
|---|---|---|
| EP | 0507552 | 10/1992 |
| JP | 59-63845 | 4/1984 |
| JP | 64-81469 | 3/1989 |
| JP | 3-68262 | 3/1991 |
| JP | 4-10757 | 1/1992 |
| JP | 4301963 | 10/1992 |
| JP | 5-75820 | 3/1993 |
| JP | 5-284321 | 10/1993 |
| JP | 6-54156 | 2/1994 |
| JP | 7-221957 | 8/1995 |
| JP | 8-116426 | 5/1996 |
| JP | 8-251370 | 9/1996 |

OTHER PUBLICATIONS

English language abstract of JP 4-10757.
English language abstract of JP 5-75820.
English language abstract of JP 7-221957.
English language abstract of JP 8-116426.
English language abstract of JP 64-81469.
English language abstract of 6-54156.
English language abstract of JP 3-68262.
English language Abstract of JP-8-251370.
English language Abstract of JP-5-284321.
English language Abstract of JP-59-63845.

* cited by examiner

FIG. 3

| PROBING TONE ||
|---|---|
| FREQUENCY (Hz) | PHASE (DEGREES) |
| 150 | 0 |
| 300 | 180 |
| 450 | 0 |
| 600 | 0 |
| 750 | 0 |
| 1050 | 0 |
| 1350 | 0 |
| 1500 | 0 |
| 1650 | 180 |
| 1950 | 0 |
| 2100 | 0 |
| 2250 | 180 |
| 2550 | 0 |
| 2700 | 180 |
| 2850 | 0 |
| 3000 | 180 |
| 3150 | 180 |
| 3300 | 180 |
| 3450 | 180 |
| 3600 | 0 |
| 3750 | 0 |

DATA COMMUNICATION APPARATUS

CROSS-REFERENCE TO RELATED APPLICATION

This is a continuation of U.S. application Ser. No. 09/077,290, filed on May 28, 1998, now U.S. Pat. No. 6,426,946 which is the National Phase of International Application No. PCT/JP97/03905, filed Oct. 28, 1997, the contents of which are expressly incorporated by reference herein in their entireties. The International Application was not published under PCT Article 21(2) in English.

The present invention relates to a data communication apparatus which shortens the time needed for a pre-communication protocol that is carried out prior to actual communication in data communication using a modem, such as facsimile communication.

BACKGROUND ART

Recently, this type of data communication apparatus performs data communication using a V.34 modem (28.8 kbps) which is specified by the ITU-T. The ITU-T also recommends T30 ANEXF (so-called Super G3) as facsimile communication standards using the V.34 modem for facsimile machines. A pre-communication protocol for facsimile communication is carried out according to the standards, after which communication of image data is executed.

Such a communication protocol will be explained based on the sequence chart illustrated in FIG. 13. FIG. 13 is a control signal chart for a pre-protocol for facsimile communication according to prior art.

Referring to FIG. 13, reference character 13a denotes a communication protocol for selecting a modulation mode from among a V34 half duplex, V34 full duplex, V17 half duplex, etc. Reference character 13b denotes a communication protocol for implementing line probing to check a line and determine various kinds of parameters. Reference character 13c denotes a communication protocol for modem training. Reference character 13d denotes a communication protocol for setting a modem parameter. Reference character 13e denotes a communication protocol for exchanging a facsimile control signal. Reference character 13f denotes a data communication protocol for the primary channel. The upper side in the diagram is a sequence for a caller modem, and the lower side is a sequence on an answer modem, and the sequences progress from left to right.

The above communication protocols will be discussed specifically.

First, in the communication protocol 13a for selecting a modulation mode and communication protocol, which permit communication between a caller modem and an answer modem, are selected through a V.21 modem (300 bps, full duplex) after a line connection is established. A facsimile machine using a V.34 modem selects a V.34 modem as the modulation mode and facsimile communication as a communication protocol.

Then the communication protocol 13b for line probing checks the line by transmitting a line probing tone from the caller modem and receiving it on the answer modem, and selects a training parameter based on the result of the line inspection.

In the communication protocol 13c for modem training, the caller modem sends training signals based on the training parameter selected under the line probing communication protocol 13b, while the answer modem receives the training signals, learns a filter coefficient for an adaptive equalizer for compensating the line characteristic and checks the reception quality of the training signals.

In the communication protocol 13d for selecting a modem parameter, modem parameters are negotiated between the caller modem and answer modem in full duplex communication as 1200 bps, and an optimal modem parameter is selected from the modem parameters preset in the apparatus, the result of the line inspection and the inspection of the reception quality of the training signals.

The communication protocol 13e for a facsimile control signal is an ordinary facsimile protocol to execute negotiation of facsimile control signals NSF, CSI, DIS, TSI, DCS, CFR, etc. in full duplex communication at 1200 bps.

In the data communication protocol 13f, the caller modem sends image data and the answer modem receives the image data, in half duplex communication at 2400 bps to 28.8 kbps. In the case of performing communication at the maximum communication rate of 28.8 kbps, image data can be communicated in approximately three seconds per a sheet of paper of size A4.

The aforementioned modem performs communication in accordance with the training parameter selected under the communication protocol 13b for selection under the communication protocol 13d for selection of a modem parameter. To compensate the line characteristic, the receiver modem executes communication using the filter coefficient that has learned in the modem training 13b. This ensure optimal data communication according to the line quality.

The above-described prior art structure involves five channels of a pre-protocol before starting sending image data after line establishment, and thus requires about 7 seconds. By contrast, since electric transmission of a single sheet of image data at the maximum communication rate of 28.8 kbps takes about 3 seconds, the pre-protocol requires over 60% of the entire time of 11 seconds required for transmission of one sheet of an original including the post-protocol of about 1 second. This time needed for the pre-protocol gets greater as the number of transmission/reception lines increases, and generates wasteful time and communication cost.

DISCLOSURE OF INVENTION

Accordingly, it is an object of the present invention to provide a data communication apparatus capable of shortening the time for pre-communication protocol including setting of various parameters for a modem and the modem training time.

A data communication apparatus according to this invention comprises communication means for executing pre-communication protocol for exchanging a communication function with a communication destination and transmission and reception of data; storage means for storing a plurality of communication parameters in association with identification numbers of apparatuses to be the communication destination; and control means for, when an apparatus of the communication destination is a communication apparatus registered in the storage means, activating the communication means using the communication parameter associated with that communication destination, read from the storage means, to thereby execute data communication according to a short protocol, and, when an apparatus of the communication destination is not a communication apparatus registered in the storage means, activating the communication means using a communication parameter acquired under a communication protocol for that communication to thereby execute data communication.

More specifically, at the time of carrying out a normal communication protocol, a modulation mode, a communication protocol, a modem parameter and a modem's optimal training time, etc., which are set by four communication channels, e.g., a communication channel for selecting a modulation mode, a communication channel for implementing line probing, a communication channel for modem training, and a communication channel for setting a modem parameter, are stored for each destination communication apparatus, and subsequent communication is implemented based on the stored information.

At this time, the control means determines if an apparatus of the communication destination is a communication apparatus registered in the storage means based on either whether or not an operation key for specifying a memory address in the storage means where an identification number and a communication parameter of the communication destination are stored has been depressed, or sender identification information informed from an exchange.

At this time, the control means transmits an instruction signal of the same modulation system as a call-initiating menu signal in place of the call-initiating menu signal to thereby inform the communication destination of execution of a short protocol.

BRIEF DESCRIPTION OF DRAWINGS

FIG. 3 is an explanatory diagram showing tones of a line probing tone signal according to this embodiment;

BEST MODES FOR CARRYING OUT THE INVENTION

Figure 1:
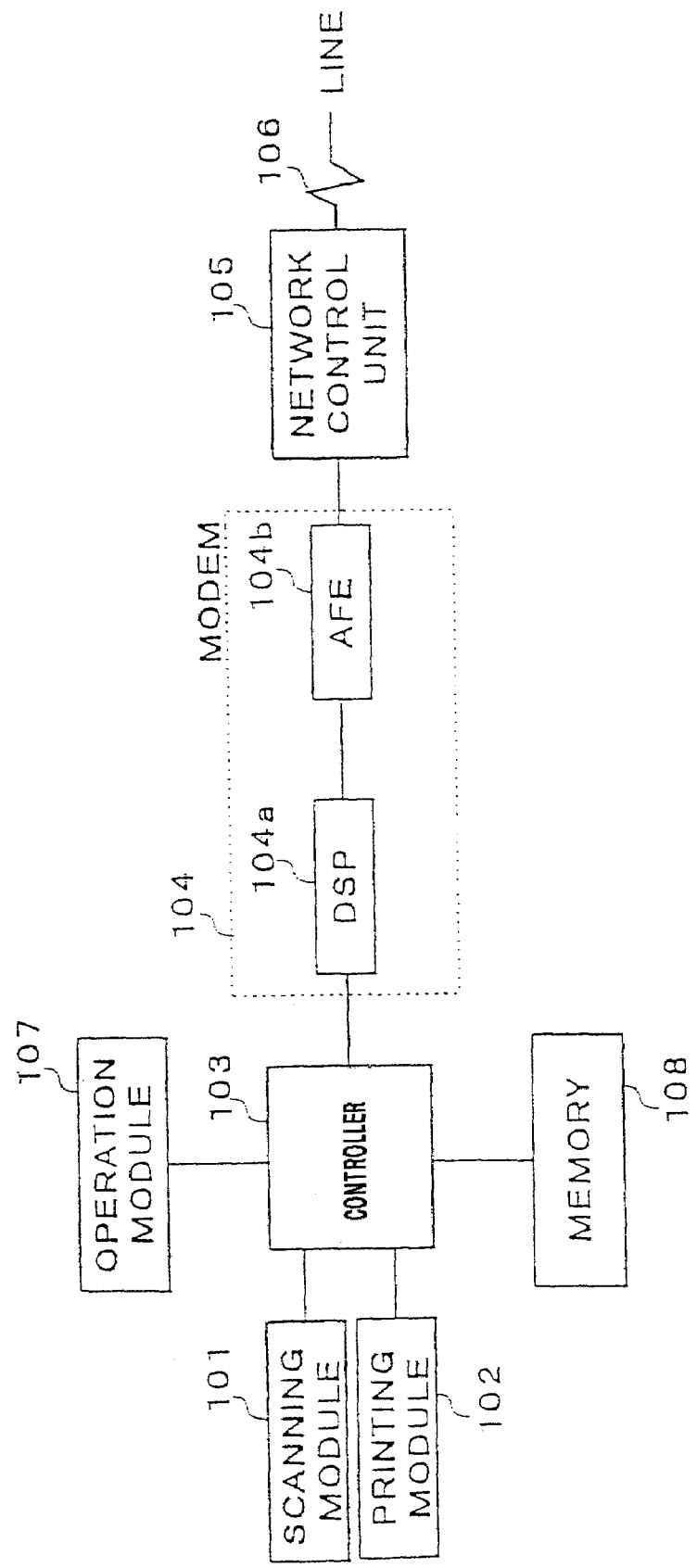
FIG. 1 is a reference structural diagram of a facsimile machine to which a data communication apparatus according to a first embodiment of this invention is adapted.

A data communication apparatus according to a first embodiment of the present invention will now be described in detail with reference to the accompanying drawings. FIG. 1 is a basic block diagram of a facsimile machine to which this invention is adapted.

Referring to FIG. 1, a scanning module 101 reads the image of an original, and a printing module 102 records and outputs a received image. A controller 103 performs the general control of the apparatus, and also carries out control to encode and decode image signals and execute a communication protocol.

A modem 104 (or communicator), which implements every modulation and demodulation in a facsimile communication protocol that is specified in T.30 ANEXF of the ITU-T, comprises a digital signal processor (DSP) 104a for performing modem's signal processing and an analog front end module (AFE) 104b having both A/D conversion and D/A conversion functions.

A network control unit (NCU) 105 controls dialing and calling to a line 106. An operation module 107 comprises various kinds of key input switches, such as dial keys and a start key, and a display unit for displaying information. Various sorts of operations of the apparatus are performed through this operation module 107.

Figure 7:
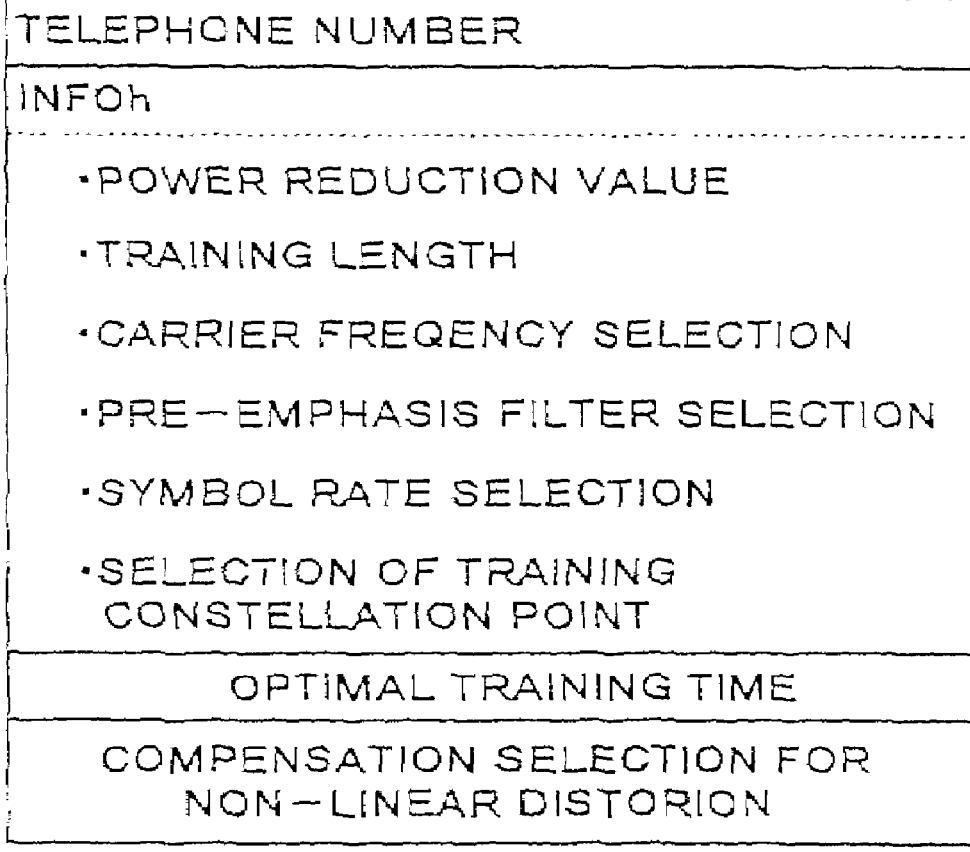
FIG. 7 is a memory structural diagram of a short protocol registration memory according to this embodiment.

A memory 108 stores various sorts of information for execution of a short protocol in the case of communicating with a communication destination which has a short protocol function. In this embodiment, information like a telephone number and a modem parameter is stored as shown in FIG. 7 which will be discussed later.

A modem parameters is set by setting a power reduction value indicative of signal power and a time value indicative of a training time, and performing various selections, such as carrier frequency selection for selectively setting either a high level or a low level, preemphasis filter selection, symbol rate selection for selectively setting five levels of rates that are transmitted for an eye pattern and selection of a training constellation point.

The functional structure of the digital signal processor 104a of the modem 104 will now be discussed with reference to FIG. 2.

A modem controller 201 controls interface with the controller 103 and various modem functions. This modem controller 201 has a plurality of functional modules which will be discussed below and which are executed by ordinary software.

A tonal transmission module 202 sends various tonal signals in accordance with communication protocols. A tonal detector 203 identifies a tonal signal sent from a communication destination. A V.21 modem 204 is a modem which conforms to Recommendation V.21 of the ITU-T (300 bps, full duplex). An INFO modem 205 is a modem which conforms to Recommendation V.34 of the ITU-T (600 bps, full duplex), and is used in a start procedure in the communication protocol for line probing and a short protocol.

A control channel modem module 206 is a control channel modem (1200 bps, full duplex) specified by Recommendation V.34 of the ITU-T, and is used in setting a modem parameter for a primary channel modem and in a communication protocol for a facsimile control signal.

A primary channel modem module 207 is a primary channel modem (2400 bps to 28.8 kbps, half duplex) specified by Recommendation V.34 of the ITU-T, and is used in communicating image data.

A line probing transmission module 208 sends line probing tones which are specified by Recommendation V.34. The line probing tone are combined signals of 21 kinds of tonal signals of 150 Hz to 3750 Hz as shown in FIG. 3.

A line probing reception module 209 receives the line probing tones from a communication destination to inspect the line. Specifically, the line probing reception module 209 performs spectrum analysis on the received signals using the fast Fourier transform algorithm to select the optimal symbol rate and carrier frequency for the primary channel modem 207 and select other modem parameters.

A training transmission module 210 sends training signal for the V.34 modem, and a training reception module 211 receives the training signals from a communication destination and learns a filter coefficient of an adaptive equalizer to compensate line distortion.

Figure 4:
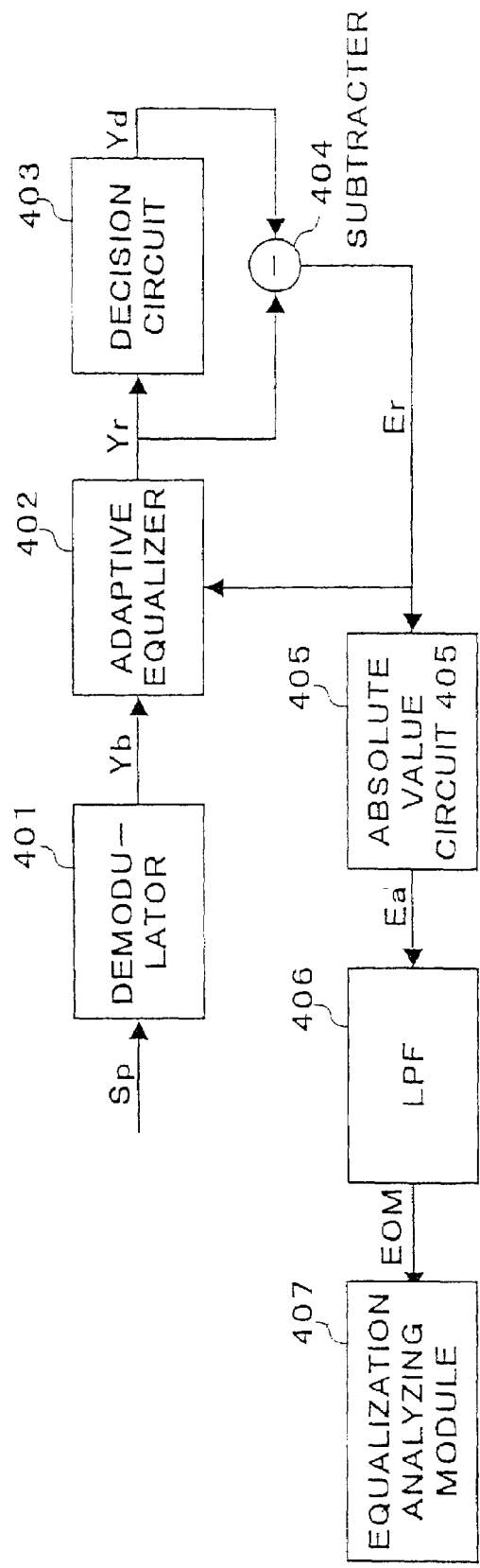
FIG. 4 is a block diagram of a training reception section according to this embodiment.

Next, this training reception module 211 will be discussed with reference to the block diagram of FIG. 4.

A demodulator 401 converts a received training signal Sp, which has undergone A/D conversion in the analog front end module 104b, to a complex baseband signal Yb from the passband. An adaptive equalizer 402 compensates line distortion with respect to the baseband signal Yb and outputs a received signal Yr. A decision circuit 403 determines a decision point Yd for determining the amount of shift of a point of an eye pattern, and outputs the decision point Yd. A subtracter 404 subtracts the decision point Yd from the received signal Yr and outputs an error signal Er. Note that Yb, Yr, Yd and Er are complex signals. The error signal Er is supplied to the adaptive equalizer 402, which learns such an internal filter coefficient as to reduce this error signal Er. The learned internal filter coefficient is used as a reception filter coefficient in the primary channel modem module 207.

An absolute value unit 405 computes the absolute of the error signal Er. An LPF 406 is a low-pass filter for smoothing the output signal, Ea, of the absolute value unit 405. The output signal of the LFP 406 is an EQM signal which represents the degree of compensation for the line distortion of the adaptive equalizer 402, and the smaller this EQM signal is, the more sufficiently the line distortion is compensated.

Figure 5:
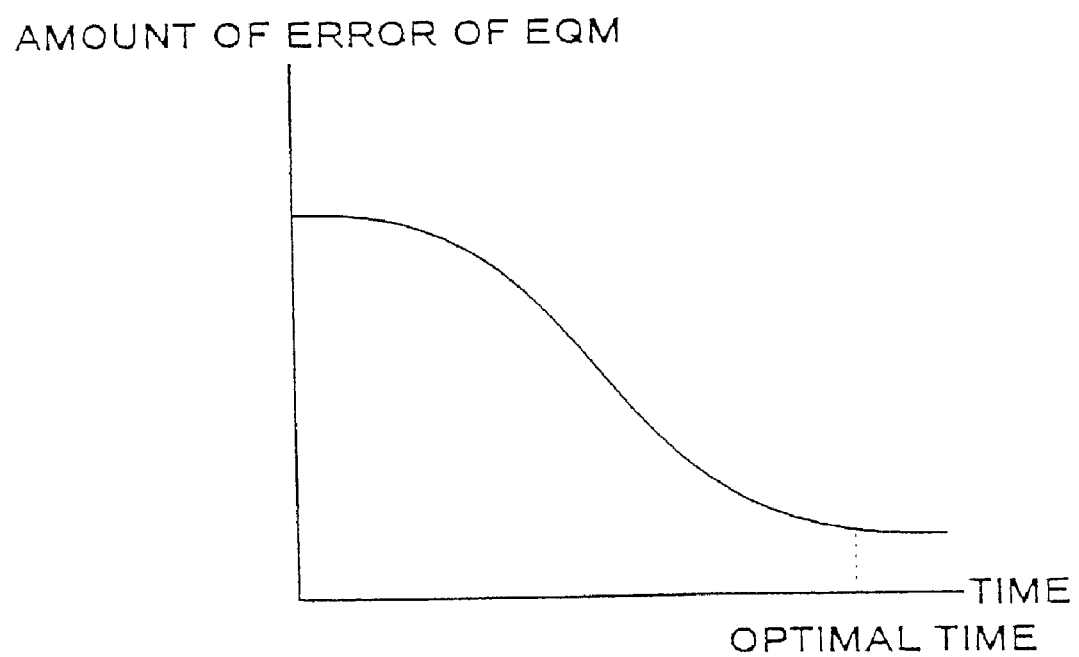
FIG. 5 is an explanatory diagram illustrating calculation of an optimal training time according to this embodiment.

An equalization analyzing module 407 analyzes the ability of the adaptive equalizer 402 to compensate the line distortion, from the EQM signal. As shown in FIG. 5, the equalization analyzing module 407 observes the amount of change in the EQM signal from the beginning of training, and computes the time at which the absolute value of the amount of change becomes smaller than a given value, as the optimal training time. The equalization analyzing module 407 also computes the ration (SN) of the training signal power (the absolute value of a point from the origin in an eye pattern) to noise power (an error in the point in the eye pattern) which is the final value of the EQM signal. The optimal training time is used as the training time in executing a short protocol, and the SN ratio is used in selecting the data transfer rate of the primary channel modem 207. When a short protocol is to be carried out, the optimal training time is not computed.

The operation of the thus constituted data communication apparatus will be discussed below.

Figure 6:
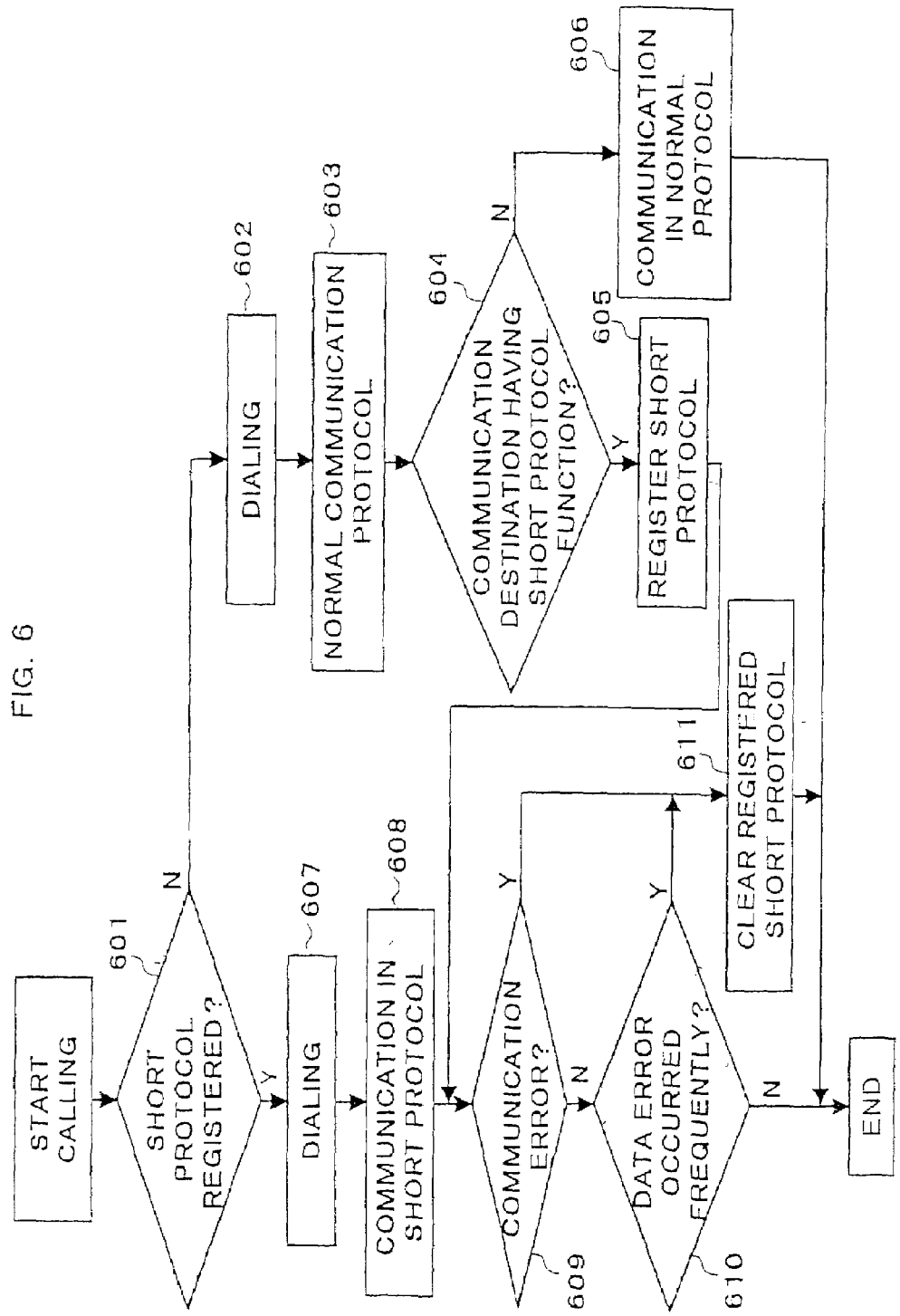
FIG. 6 is a flowchart illustrating a control operation at the time of transmitting an outgoing signal according to this embodiment.

To begin with, the operation of a caller modem will be discussed. FIG. 6 is a flowchart illustrating a control operation of a facsimile machine according to this embodiment at the time of transmitting an outgoing signal.

In step (hereinafter referred to as "ST") 601, calling is initiated in accordance with the telephone number of a transmission destination and a transmission start instruction from the operation module 107, the memory 108 is searched to check if the telephone number of the transmission destination is registered for a short protocol. When registration is not made, the flow proceeds to ST 602 to make dialing.

In ST 603, facsimile communication is carried out in a normal communication protocol based on T.30 ANEXF of the ITU-T.

In ST 604, it is checked if the destination machine supports a short protocol communication. This check is accomplished by detecting a flag indicating that a short protocol communication is possible, in a field for the non-standard protocol signal NSF in a facsimile control signal.

In ST 605, when the destination facsim having a short protocol function can be confirmed, the transmitter mode executes a normal protocol and registers various parameters necessary to implement a short protocol. The contents to be registered for a short protocol are, for example, selected information on the power reduction value and carrier frequency, the optimal training time, selected information on a non-linear distortion compensation value, etc. Those information are stored in the memory 108 in accordance with the memory structure of the short protocol registration memory illustrated in FIG. 7.

When a flag indicating that a short protocol communication is possible could not be detected in ST 604, communication is implemented in a normal communication protocol the in ST 606.

In the case of the short protocol registration in ST 601, dialing is made and a short protocol communication is carried out in ST 607 and ST 608. In the short protocol communication, a modem parameter in the short protocol registration memory 108 is sent to the transmission destination in the start procedure to execute the transmission operation according to the modem parameter. This eliminates the need for negotiation with the receiver, thus shortening the communication time.

In ST 609, it is determined if there is a communication error, and in the case of no communication error, the flow proceeds to ST 610. In ST 610, the rate of data errors in communication is determined, and when there are not many data errors, the process will be terminated. This error rate decision has only to be made based on, for example, the number of resends in ECM.

When it is determined in ST 609 that there is a communication error and when it is determined in ST 610 that there are multiple data errors, the contents of the short protocol registered for the transmission destination are erased from the memory 108 in ST 611, after which the process will be terminated.

The reason why a communication control protocol is executed in accordance with various communication parameters, which have been prestored in association with destination telephone numbers in the above manner, is based on the following.

Generally, facsimile machines are often connected one to a single line. As communication is often carried out in the same mode with respect to the same communication destination, therefore, a control protocol for exchanging the data communication mode need not be executed every time communication is carried out if the previous communication mode is stored in a transmitting apparatus and receiving apparatus.

Because the quality of a telephone line has been improved due to the recent widespreading of digital exchanges, therefore, there becomes no difference in line characteristics which originates from a difference in connection paths. As a result, similar line characteristic and communication quality are always provided for the same communication destination. If previous modem parameters are stored, therefore, it is necessary to conduct a communication protocol associated with line probing for each communication.

Further, the training time, which is set in accordance with the learning time for the filter coefficient of the adaptive equalizer of a receiving apparatus, is generally set to the length that can be adapted for every line. When communication is implemented over a line with a high communication quality, therefore, the learning time for the filter coefficient can be shorter than the normally set one, so that the training time may be wasted. In view of the above, the execution time of a pre-communication protocol is shortened by carrying out the pre-communication protocol using a prestored communication parameter.

Figure 8:
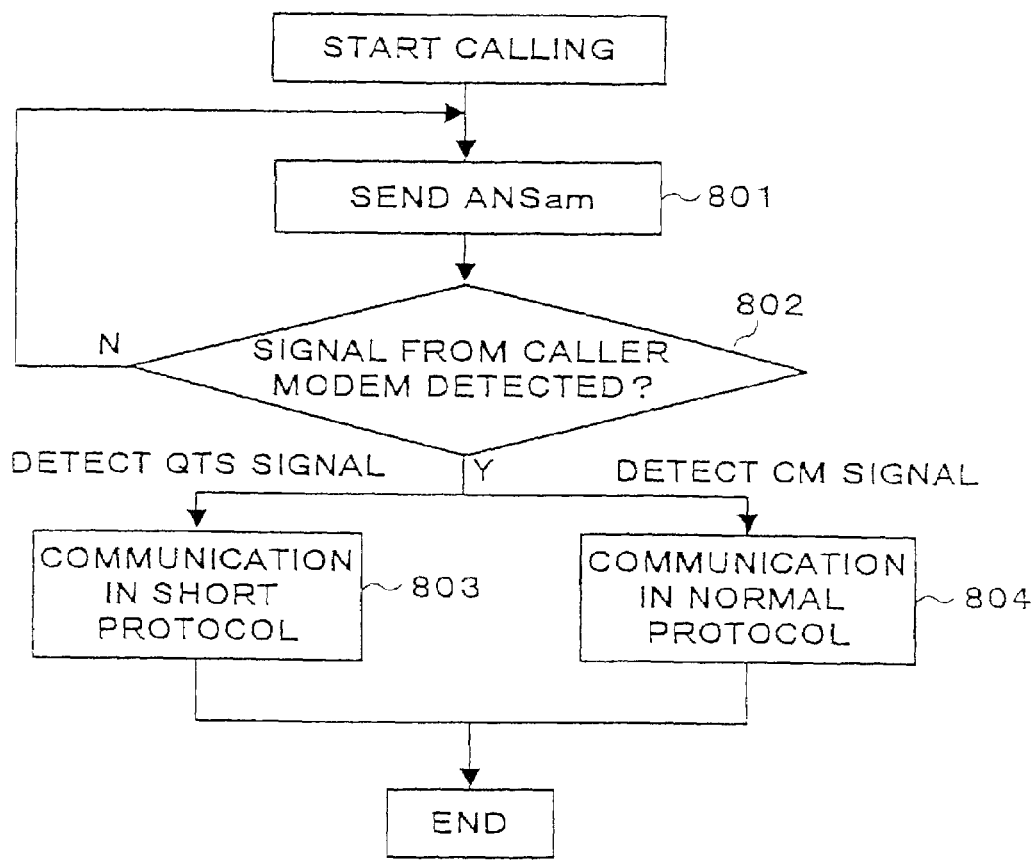
FIG. 8 is a flowchart illustrating a control operation at the time of receiving an incoming signal according to this embodiment.

Next, the operation of the receiver of an answer modem will be explained. FIG. 8 presents a flowchart illustrating a control operation for a pre-communication protocol at the time a facsimile machine according to this embodiment receives an incoming signal.

In ST 801, after receiving a reception command sent over the line 106, a modified answer tone ANSam is sent.

In ST 802, it is detected whether to receive a quick tonal signal (QTS) indicating a short protocol or a call menu signal CM from the caller modem, while sending the ANSam.

In ST 803 and ST 804, communication is executed using a registered communication parameter when the QTS signal is detected, while communication is executed in a normal protocol according to the T.30 ANEXF of the ITU-T when the CM signal is detected. When the receiver is equipped with a function to conduct a short protocol, a short protocol registration flag indicating that the local apparatus has the short protocol capability and the optimal training time are described in the NSF field of the facsimile control signal at the time of implementing communication in the normal protocol. The transmitter registers a short protocol for this receiver based on the information in the NSF field.

The normal communication protocol according to Recommendation V.34 will be discussed. Registering various parameters for use in executing a short protocol is conducted in accordance with the information in the NSF field in this normal communication protocol.

Figure 9:
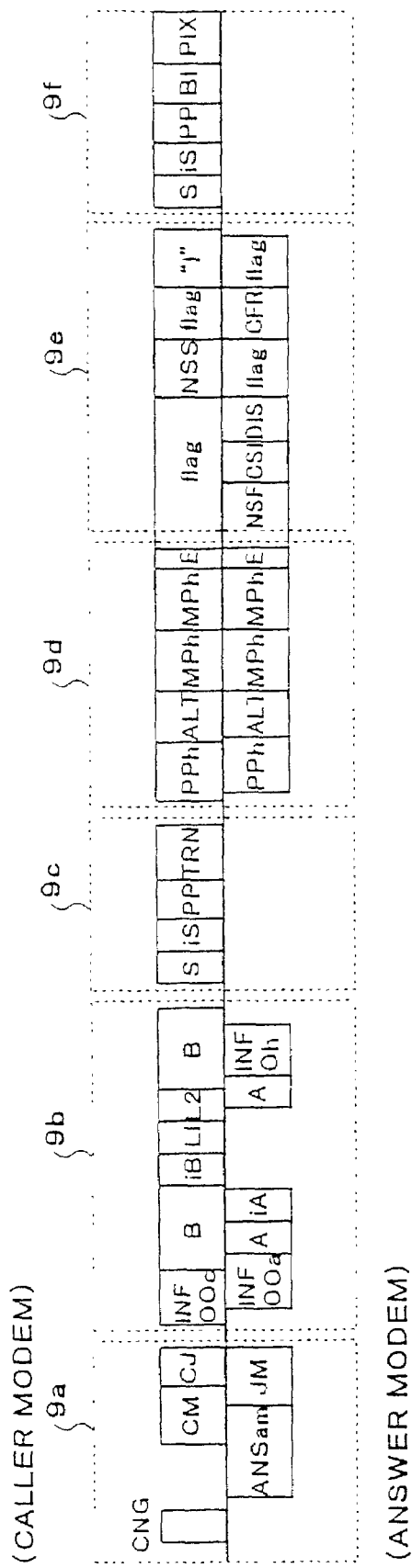
FIG. 9 is a control signal chart for a normal protocol at the time of registering a short protocol according to this embodiment.

FIG. 9 is a control signal chart for this communication protocol. After a line connection is established, a communication protocol 9a for selecting a modulation mode is performed, followed by a communication protocol 9b for line probing, a communication protocol 9c for modem training, a communication protocol 9d for setting a modem parameter, a communication protocol 9e for a facsimile control signal, and then a data communication protocol 9f for sending image data.

The communication protocol 9a for selecting a modulation mode will specifically be discussed below. A caller modem sends a caller number identification signal CNG, and an answer modem sends a modified answer tone ANSam. Thereafter, the caller modem sends a call menu signal CM indicative of the functions of the caller modem, such as the modulation mode and communication protocol, while the answer modem sends a joint menu signal JM indicative of a common communication capability in accordance with the contents of the received signal CM. When acknowledging this joint menu signal JM, the caller modem sends a CM terminal signal CJ and then proceeds to the communication protocol 9b for line probing. The answer modem detects the CM terminal signal CJ while sending a joint menu signal JM, and then also goes for the communication protocol 9b for line probing. The signals CM, JM and CJ are communicated throught the V.21 modem 204 (300 bps, full duplex). Based on the exchange of those signals, a facsimile machine with a V.34 modem, for example, can select a modulation mode for the V.34 modem and a facsimile communication protocol as the communication protocol.

Next, the communication protocol 9b for line probing will be described. The caller modem sends INFO0c indicative of a communication capability, such as the preset modulation rate and carrier frequency for the V.34 modem, and line probing tones L1 and L2. The answer modem sends INFO0a indicative of the mentioned, preset communication capability, and receives the line probing tones. The line probing tones are combined signals of 21 kinds of tonal signals of 150 Hz to 3750 Hz as shown in FIG. 3.

The answer modem receives the line probing tones, performs spectrum analysis on the received signals using the fast Fourier transform algorithm to select the optimal symbol rate and carrier frequency for the primary channel modem 207 and select other modem parameters. The answer modem selects a communicatable training parameter from the selected contents and the contents of INFO0c and INFO0a, sets INFO0h and sends the training parameter and INFO0h.

Figure 2:
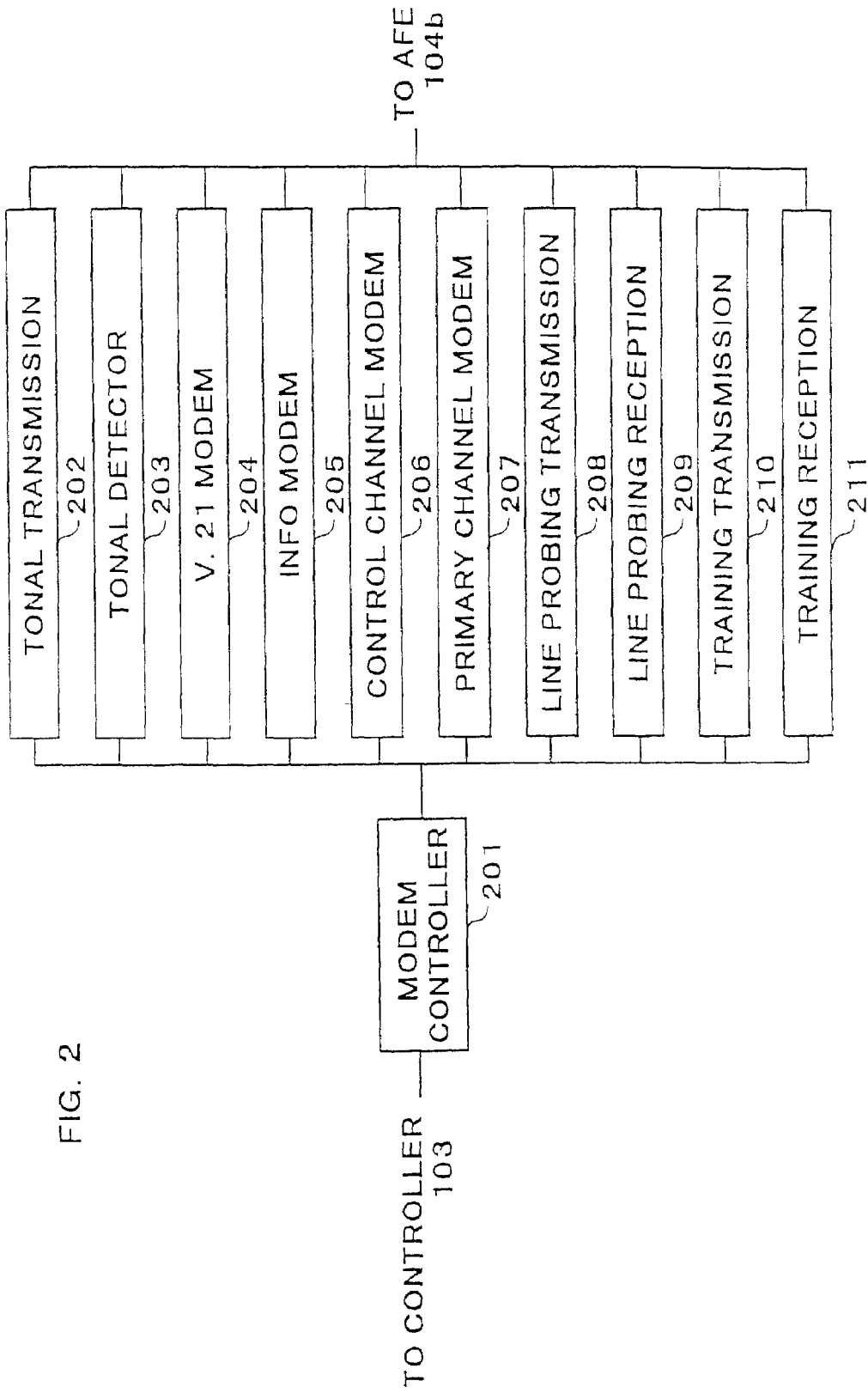
FIG. 2 is a functional structural diagram of a digital signal processor (DSP) according to this embodiment.

The aforementioned INFO0c, INFO0a and INFO0h are communicated through the INFO modem 205 (600 bps, full duplex) shown in FIG. 2. This communication protocol uses tones B and iB (having a phase of 180 degrees to the tone B) of the caller modem, and tones A and iA (having a phase of 180 degrees to the tone A) of the answer modem, as response signals for accomplishing synchronization.

Next, the communication protocol 9c for modem training will be described. The caller modem sends training signals S, iS, PP and TRN using the training parameter of the aforementioned INFO0h sequence. The answer modem receives the training signals and learns the filter coefficient of the adaptive equalizer 402 for compensating the line characteristic, or computes the optimal training time and noise power ratio SN in the equalization analyzing module 407.

The communication protocol 9d for setting a modem parameter will now be discussed. The caller modem and the answer modem send protocol sync signals PPh and ALT, a modem parameter MPh associated with data communication and an acknowledge signal E for the MPh from the opposite side, so that the caller modem and the answer modem exchange the MPh. The MPh of the caller modem is a modem parameter preset in the caller modem, while the MPh of the answer modem is a modem parameter, which has been selected from a preset modem parameter, the result of inspecting the received line probing tones and the SN computed from the received training signals. The communication protocol for setting a modem parameter is carried out using the control channel modem module 206 (1200 bps, full duplex) shown in FIG. 2.

Next, the communication protocol 9e for a facsimile control signal will be described. First, the answer modem sends a non-standard protocol signal NSF, a called station identification signal CSI, and a digital identification signal DIS. The answer modem sets, in the NSF field, a flag indicating that it has a short protocol capability and the optimal training time calculated in the equalization analyzing module 407, before transmission.

After sending the NSF, CSI and DIS and acknowledging that the answer modem has a short protocol capability, the communication apparatus of the caller modem sends a transmitting station identification signal TSI and a digital command signal DSC. At that time, the communication apparatus of the caller modem sets a short protocol registration flag and stores various communication parameters, exchanged in the current communication protocol, in the memory 108 in association with the destination's telephone number. After receiving the TSI and DCS, the answer modem sends a reception preparation acknowledgement CFR.

When one of the caller modem and answer modem does not have a short protocol capability in other cases than the above-discussed ones, the caller modem does not set the short protocol registration flag. In this case, therefore, a communication protocol for a facsimile control signal is executed using the control channel modem module 206 (1200 bps, full duplex) in accordance with the ordinary V.34 protocol.

Finally, the data communication protocol 9f for the primary channel will now be discussed. Communication here is implemented by using a modem parameter, which is determined in accordance with the training parameter of the INFO0h sequence and the MPh and satisfies both the caller modem and the answer modem.

The caller modem sends protocol sync signals S, iS, PP and B1 for the primary channel, and then sends PIX (image data). The answer modem receives the protocol sync signals S, iS, PP and B1 followed by the PIX (image data).

Communication here is carried out with the primary channel modem module 207 (1200 bps to 28.8 kbps, half duplex), and particularly, reception by the primary channel modem module 207 of the answer modem is so designed as to compensate line distortion using the filter coefficient that has been learned by the adaptive equalizer 402. At the maximum communication rate of 28.8 kbps over the primary channel, communication can be done in about 3 seconds per a single sheet of size A4.

As apparent from the above, the communication protocol in the case of a registered short protocol is carried out in the normal protocol as recommended by the T.30 ANEXF of the ITU-T. As a short protocol is registered in the memory 108 of the caller modem, communication can be implemented using the registered short protocol from the next time.

A communication protocol in the case of carrying out a short protocol will now be discussed specifically.

Figure 10:
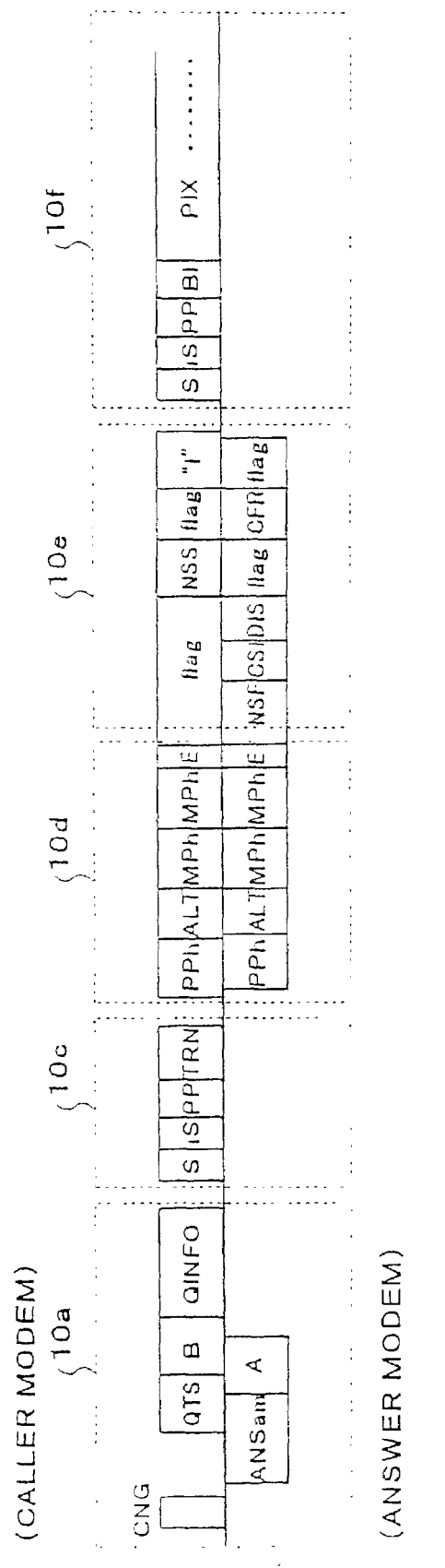
FIG. 10 is a control signal chart at the time of executing the short protocol according to this embodiment.

FIG. 10 is a control signal chart for a communication protocol at the time of executing a short protocol, and illustrates a communication process from the establishment of a line connection up to communication of image data. After a line connection is established, a communication protocol 10a for initiating a short protocol is performed, after which a communication protocol 10c for modem training, a communication protocol 10d for setting a modem parameter, a communication protocol 10e for a facsimile control signal and a data communication protocol 10f for sending data (image data) will be carried out in the normal communication protocol.

The communication protocol 10a for initiating a short protocol will be explained first. A caller modem sends a caller number identification signal CNG, and an answer modem sends a modified answer tone ANSam. After detecting this modified answer tone ANSam, the caller modem sends a quick tonal signal QTS, and sends tones B and QINFO upon detection of a response signal tone A from the answer modem. After detecting the quick tonal signal QTS from the caller modem, the answer modem sends the tone A and receives the QINFO from the caller modem.

This quick tonal signal QTS becomes a signal to command transition to the short protocol. The quick tonal signal QTS is a repeated pattern of "001100110011 . . . ". Such a tonal signal pattern is used to permit the receiver to clearly distinguish the received the quick tonal signal QTS from a signal pattern of the flag sequence ("011110") and the tonal signal pattern of the call menu signal CM (2-bit start bits "10, " 8-bit data and stop bit of "1"), which are defined by Recommendation T.30 of the ITU-T. Moreover, as the quick tonal signal QTS has the same modulation system as the call menu signal CM, the receiver modem can easily discriminate whether the communication is to be implemented in a short protocol or a normal protocol, depending on whether the incoming tonal signal is the quick tonal signal QTS or the call menu signal CM.

In the QINFO sequence, communication is carried out with the INFO modem 205 (600 bps, full duplex) in accordance with the contents registered in the short protocol registration memory for each destination's telephone number, i.e., in accordance with the training parameter (INFO0h), the optimal training time and the selected contents for non-linear distortion compensation in the case of a registered short protocol, as has been explained above with reference to FIG. 6.

In the next communication protocol 10c for modem training, training the transmitting apparatus and the receiving apparatus is performed in accordance with the training parameter (INFO0h) of the QINFO sequence and the optimal training time.

In the communication protocol 10d for setting a modem parameter, the MPH for the answer modem is set based on the QINFO-based selection of non-linear distortion compensation and information of the SN ratio computed in the communication protocol 10c for modem training.

The communication protocol in the short protocol is carried out in such a manner that the communication protocol for starting the short protocol is executed in an exclusive protocol and the communication protocol for modem training and the subsequent communication protocols are performed in accordance with the recommendation for T.30 ANEXF of the ITU-T, thereby shortening the pre-protocol.

A data communication apparatus according to a second embodiment of the invention will be described with reference to a flowchart illustrated in FIG. 11.

While registration of a short protocol is conducted in association with a destination's telephone number at the time of dialing on a caller modem in the first embodiment, the second embodiment uses a caller telephone number informing service by an exchange, which has recently started, to register a modem parameter on an answer modem in association with the caller telephone number.

Figure 11:
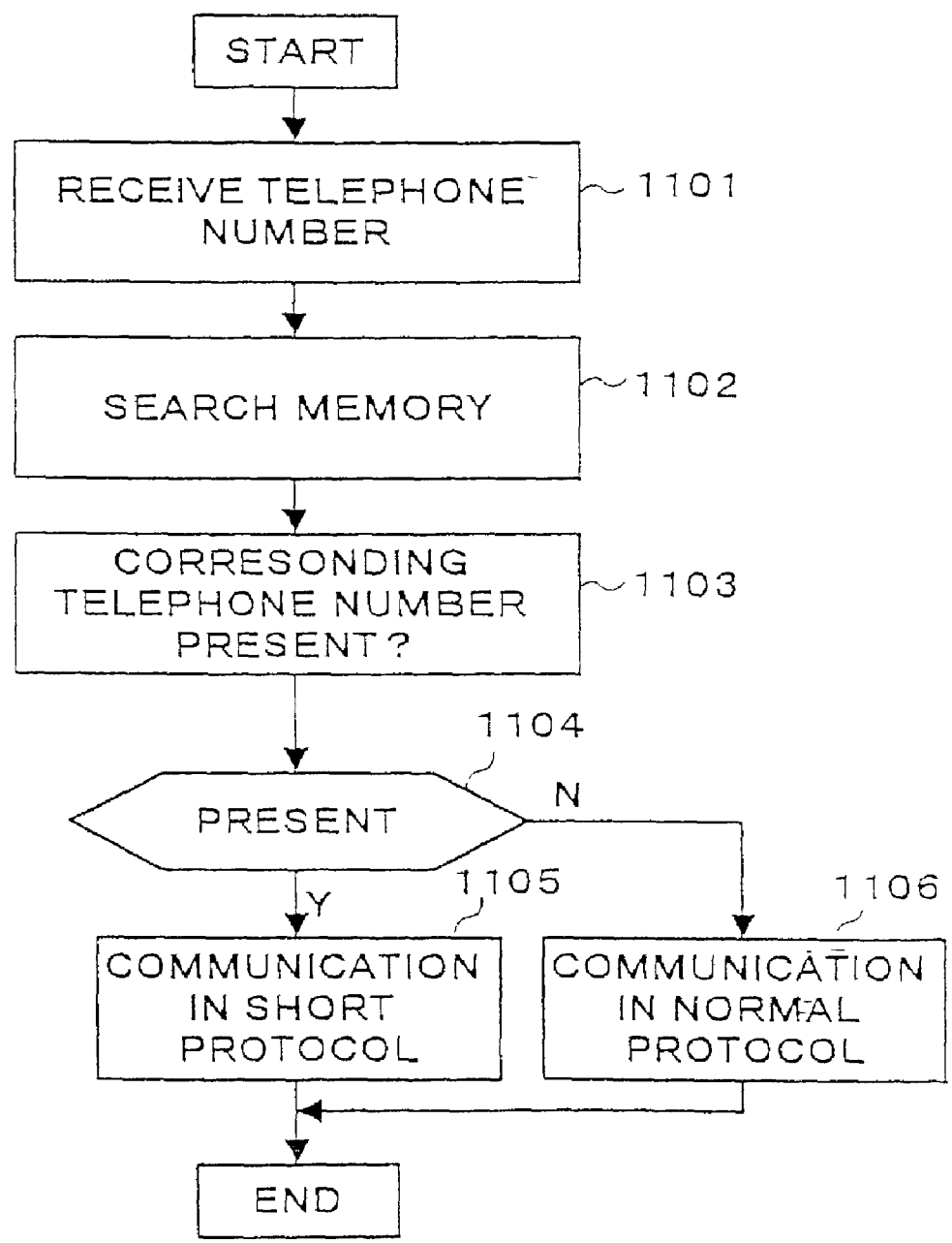
FIG. 11 is a flowchart illustrating a control operation when a telephone number informing service of a data communication apparatus according to a second embodiment of this invention.

Referring to FIG. 11, when a receiver modem is informed of a telephone number through the caller telephone number informing service (ST 1101), the receiver modem searches telephone numbers (ST 1102), and executes short protocol communication (ST 1105) when there is a corresponding telephone number (ST 1103, ST 1104). When there is no corresponding telephone number, normal protocol communication is carried out (ST 1106).

Figure 12:
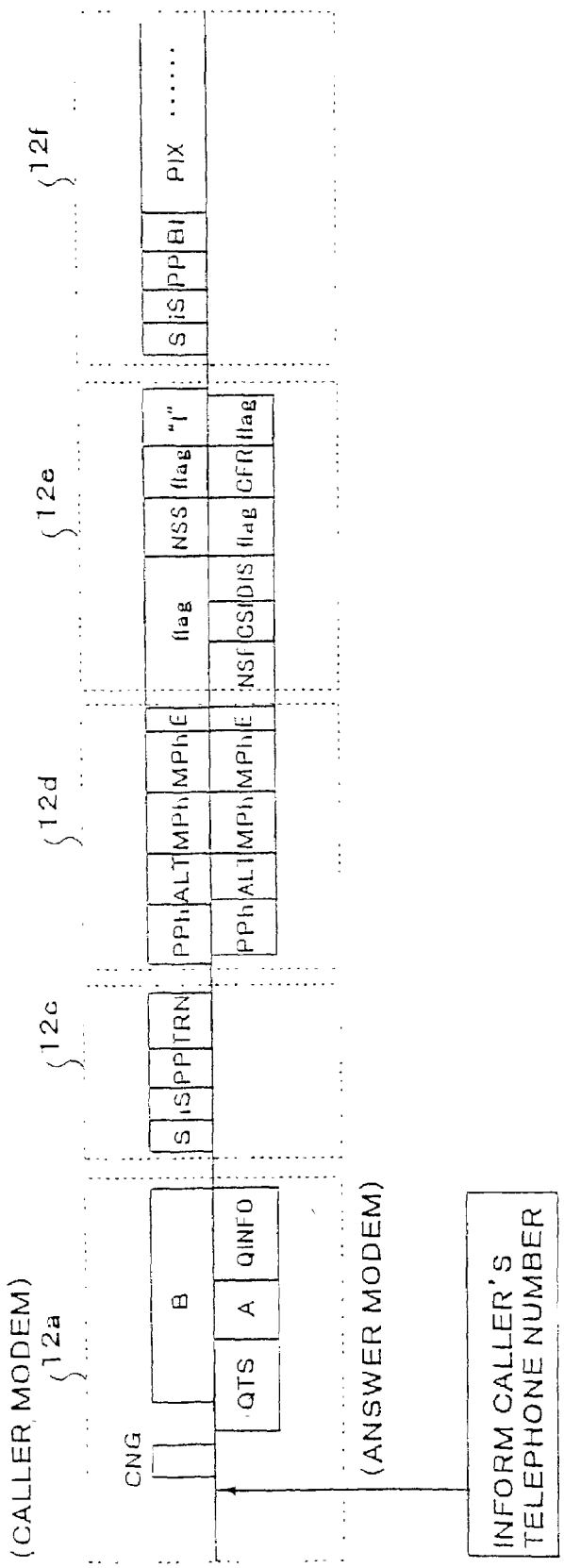
FIG. 12 is a control signal chart when the telephone number informing service according to this embodiment is used.
Figure 13:
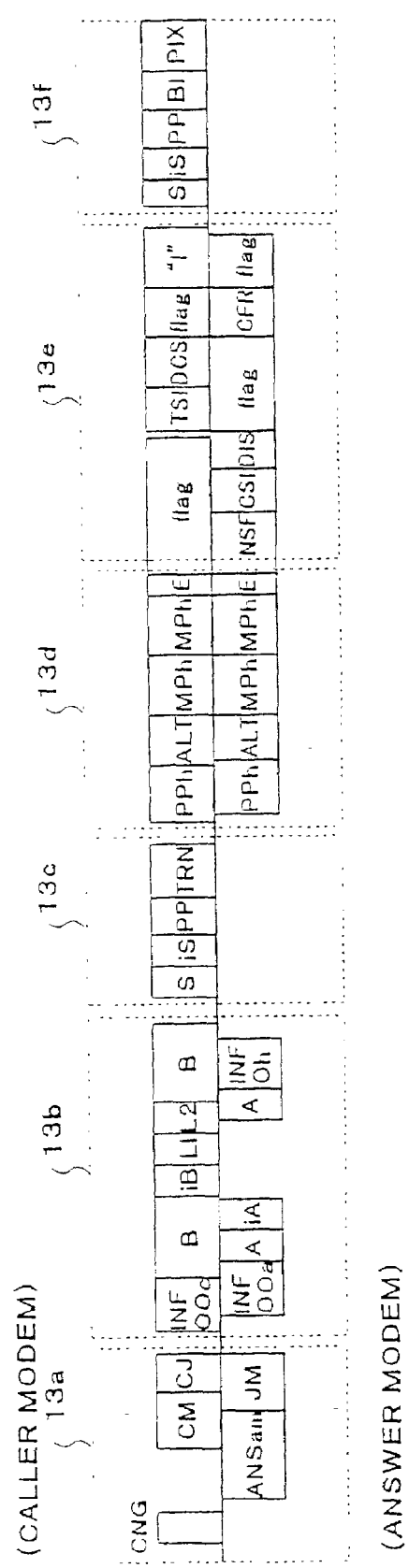
FIG. 13 is a control signal chart showing a normal protocol for a conventional modem.

The above communication control procedures will now be explained with reference to a control signal chart shown in FIG. 12.

When informed of a caller telephone number, a receiver apparatus executes a communication protocol 12a in which the receiving apparatus sends a QTS signal to the sender to inform that short protocol communication is to be conducted. The subsequent procedures are the same as described above. That is, a communication protocol 12c for modem training, a communication protocol 12d for setting a modem parameter, a communication protocol 12e for a facsimile control signal and a data communication protocol 12f are executed in order.

Although the QTS signal is different from the QINFO for informing a modem parameter or the like in the above-described embodiment, it is easy to make a modification of shortening the protocol time by including information of the modem parameter or the like in the QTS signal.

In the embodiment, either the transmitting apparatus or the receiving apparatus registers information such as the modem parameter, the optimal training time and the modulation mode in the memory. But, the transmitting apparatus and the receiving apparatus may both register those information in the memories. This allows the transmitting apparatus and the receiving apparatus to skip the communication protocol 12a and start from the communication protocol 12b upon reception of an incoming signal. In this case, the time for the pre-communication protocol is further shortened because such information need not be exchanged in the communication protocol.

According to this invention, as discussed above, normal protocols for modulation mode selection, line probing and modem training are performed and a modem parameter selected than and the optimal training time computed then are stored in association with a destination's telephone number, so that in the subsequent communication, the communication protocol for modulation mode selection and the communication protocol for line probing can be skipped and the communication protocol for modem training can be performed at the optimal training time in accordance with the stored modem parameter and optimal training time. It is therefore possible to significantly shorten the time for the pre-communication protocol without impairing the communication capabilities.

INDUSTRIAL APPLICABILITY

A data communication apparatus in the present invention is appropriate for the case where a facsimile apparatus according to T30 ANEX (so-called Super G3), which is recommended as a communication standard for facsimile apparatus with the V.34 modem recommended by ITU-T, is communicating mutually.

The invention claimed is:

1. A data communication apparatus that performs a pre-communication protocol with a destination terminal and transmits image data to the destination terminal, the data communication apparatus comprising:
   a memory configured to store parameters for at least one destination terminal;
   a controller configured to determine whether or not parameters for a destination terminal are stored in the memory;
   a communicator configured, when the controller determines that the parameters for the destination terminal are stored in the memory, to perform a short protocol with the destination terminal, using the parameters stored in the memory, and when the controller determines that the parameters for the destination terminal are not stored in the memory, to perform a normal protocol with the destination terminal, obtaining parameters from the destination terminal and using the parameters obtained from the destination terminal in the normal protocol, the communicator being further configured to receive a non-standard facilities signal from the destination terminal during the normal protocol;
   said controller being further configured to determine whether or not the non-standard facilities signal received by the communicator indicates that the destination terminal can perform the short protocol; and
   the controller being further configured to store, in the memory, the parameters obtained from the destination terminal when the controller determines that the non-standard facilities signal indicates that the destination terminal can perform the short protocol.

2. The data communication apparatus according to claim 1, wherein the parameters include a power reduction value.

3. The data communication apparatus according to claim 1, wherein the parameters include a carrier frequency.

4. The data communication apparatus according to claim 1, further comprising a scanner configured to scan data to be transmitted to the destination terminal and a printer configured to print data received from a transmitter.

5. The data communication apparatus according to claim 4, wherein said scanner and said printer comprise portions of a facsimile apparatus.

6. A communication method for utilization by a data communication apparatus that performs a pre-communication protocol with a destination terminal and that transmits image data to the destination terminal, the data communication apparatus having a memory that stores parameters for destination terminals, the communication method comprising:
   determining whether or not parameters for a destination terminal are stored in the memory;
   performing, when the parameters for the destination terminal are determined to be stored in the memory, a short protocol with the destination terminal, using the parameters stored in the memory;
   performing, when the parameters for the destination terminal are determined not to be stored in the memory, a normal protocol with the destination terminal to obtain parameters from the destination terminal, using the parameters obtained from the destination terminal, and receiving a non-standard facilities signal from the destination terminal;
   determining whether or not the received non-standard facilities signal indicates that the destination terminal can perform the short protocol; and
   storing, in the memory, the parameters obtained from the destination terminal when the non-standard facilities signal is determined to indicate that the destination terminal can perform the short protocol.

7. The communication method according to claim 6, wherein the parameters include a power reduction value.

8. The communication method according to claim 6, wherein the parameters include a carrier frequency.

9. The communication method according to claim 6, further comprising scanning data to be transmitted to the destination terminal and printing data received from a transmitter.

10. A data communication apparatus comprising:
    a communicator configured to perform a pre-communication protocol to exchange a communication function with a destination terminal and to transmit data to the destination terminal after performing the pre-communication protocol;
    a controller configured to detect whether or not parameters are stored to enable the destination terminal to perform a short protocol in which part of a normal protocol is not performed;

a communicator configured to perform the short protocol when the controller detects that the parameters are stored and to perform a normal protocol when the detector detects that the parameters are not stored;

the communicator, being further configured, to receive, during the normal protocol, a non-standard facilities signal from the destination terminal, the non-standard facilities signal indicating whether or not the destination terminal can perform the short pre communication protocol; and the controller being further configured to store parameters obtained from the destination terminal indicating that the destination terminal can perform the short protocol in a memory.

* * * * *